United States Patent
Caldeira

(10) Patent No.: US 11,399,524 B2
(45) Date of Patent: Aug. 2, 2022

(54) MULTI-FACET LURE

(71) Applicant: Brad W Caldeira, Margate, FL (US)

(72) Inventor: Brad W Caldeira, Margate, FL (US)

( * ) Notice: Subject to any disclaimer, the term of this patent is extended or adjusted under 35 U.S.C. 154(b) by 312 days.

(21) Appl. No.: 15/675,688

(22) Filed: Aug. 11, 2017

(65) Prior Publication Data

US 2018/0132461 A1 May 17, 2018

Related U.S. Application Data

(60) Provisional application No. 62/423,480, filed on Nov. 17, 2016.

(51) Int. Cl.
| | |
|---|---|
| *A01K 97/02* | (2006.01) |
| *A01K 85/01* | (2006.01) |
| *A01K 85/12* | (2006.01) |
| *A01K 85/00* | (2006.01) |
| *A01K 85/16* | (2006.01) |

(52) U.S. Cl.
CPC ............ *A01K 97/02* (2013.01); *A01K 85/018* (2022.02); *A01K 85/122* (2022.02); *A01K 85/128* (2022.02); *A01K 85/1851* (2022.02); *A01K 85/16* (2013.01)

(58) Field of Classification Search
CPC ........ A01K 85/00; A01K 85/01; A01K 85/16; A01K 91/06; A01K 97/02; A01K 85/018; A01K 85/019; A01K 85/12; A01K 85/122; A01K 85/128; A01K 85/1841; A01K 85/1847; A01K 85/1851

USPC ........... 43/44.99, 42.06, 42.22, 42.36, 42.19, 43/42.2, 42.21, 42.35, 42.46
See application file for complete search history.

(56) References Cited

U.S. PATENT DOCUMENTS

| | | | | |
|---|---|---|---|---|
| 2,597,982 | A * | 5/1952 | Fitzgerald | A01K 85/16 43/42.35 |
| 2,639,536 | A * | 5/1953 | Hartman | A01K 83/06 43/41 |
| 2,709,317 | A * | 5/1955 | Pease, Sr. | A01K 97/02 43/44.99 |
| 2,748,522 | A * | 6/1956 | Mulcaheyjohn | A01K 85/16 D22/129 |
| 2,765,575 | A * | 10/1956 | Gfroerer | A01K 97/02 206/0.5 |
| 2,769,268 | A * | 11/1956 | Miller | A01K 85/01 D22/129 |
| 2,835,999 | A * | 5/1958 | Gillian | A01K 85/12 43/42.21 |
| 2,844,907 | A * | 7/1958 | Merton | A01K 97/02 43/44.99 |

(Continued)

FOREIGN PATENT DOCUMENTS

| | | | | |
|---|---|---|---|---|
| FR | 907251 | A * | 3/1946 | |
| GB | 2446466 | A * | 8/2008 | ............ A01K 97/02 |

(Continued)

*Primary Examiner* — Darren W Ark
(74) *Attorney, Agent, or Firm* — Jeanette M. Braun; John J. Mariane; Kajane McManus

(57) ABSTRACT

The present invention relates to an improved fishing lure having the ability to be camouflaged. More particularly, the present invention relates to a fishing lure having multiple catching devices with capacity for varying the bait and size of lures, having a built-in compartment adapted for the insertion of live bait or chum used in the attraction of fish.

11 Claims, 6 Drawing Sheets

(56) References Cited

U.S. PATENT DOCUMENTS

| | | | | |
|---|---|---|---|---|
| 2,952,936 A * | 9/1960 | White | A01K 85/12 | D22/129 |
| 2,983,065 A * | 5/1961 | Ferguson | A01K 85/16 | 43/44.99 |
| 3,654,724 A * | 4/1972 | Charron | A01K 85/01 | 43/41.2 |
| 3,769,740 A * | 11/1973 | Lang | A01K 97/02 | 43/44.99 |
| 3,780,467 A * | 12/1973 | Lueck | A01K 93/00 | 43/44.87 |
| 3,916,556 A * | 11/1975 | Armanno | A01K 85/16 | 43/42.22 |
| 3,974,591 A * | 8/1976 | Ray | A01K 91/06 | 43/44.99 |
| 4,205,476 A * | 6/1980 | Hsu | A01K 85/01 | 43/42.06 |
| 4,267,658 A * | 5/1981 | Brown | A01K 85/01 | 43/44.99 |
| 4,603,502 A * | 8/1986 | MacDonald | A01K 83/06 | 43/44.99 |
| 4,829,705 A * | 5/1989 | Dorsey | A01K 91/18 | 43/44.99 |
| 5,027,543 A * | 7/1991 | Peterson | A01K 85/00 | 43/42.25 |
| 5,174,059 A * | 12/1992 | Durbin | A01K 69/06 | 43/44.99 |
| 5,319,875 A * | 6/1994 | Brandolino | A01K 85/01 | 43/44.99 |
| 5,617,669 A * | 4/1997 | Levey | A01K 97/02 | 43/44.99 |
| 5,638,630 A * | 6/1997 | Volaski | A01K 85/16 | 43/44.99 |
| 5,870,850 A * | 2/1999 | Gramse, Jr. | A01K 85/01 | 43/42.31 |
| 6,408,565 B1 * | 6/2002 | Duncan | A01K 85/18 | 43/42.06 |
| 6,588,138 B1 * | 7/2003 | Gilbert | A01K 85/01 | 43/42 |
| 7,043,870 B1 * | 5/2006 | Sydow | A01K 91/06 | 43/42.06 |
| 7,520,086 B2 * | 4/2009 | Melhorn | A01K 91/06 | 43/42.06 |
| 8,474,174 B2 * | 7/2013 | Norman | A01K 91/06 | 43/42.05 |
| 9,155,291 B1 * | 10/2015 | Russ | A01K 97/02 | |
| 9,596,837 B2 * | 3/2017 | Madala | A01K 83/00 | |
| 9,622,462 B2 * | 4/2017 | Madala | A01K 85/18 | |
| 2004/0068916 A1 * | 4/2004 | Harris | A01K 97/02 | 43/44.99 |
| 2006/0174534 A1 * | 8/2006 | Melhorn | A01K 97/02 | 43/44.99 |
| 2009/0255164 A1 * | 10/2009 | Jones | A01K 97/02 | 43/4.5 |
| 2011/0277371 A1 * | 11/2011 | Norman | A01K 85/01 | 43/42.06 |
| 2015/0075057 A1 * | 3/2015 | Korunsky | A01K 97/02 | 43/42.06 |
| 2016/0081316 A1 * | 3/2016 | Madala | A01K 83/00 | 43/42.06 |
| 2016/0157472 A1 * | 6/2016 | Neal | A01K 85/18 | 43/41 |
| 2019/0082667 A1 * | 3/2019 | Gamache | A01K 85/01 | |
| 2021/0120795 A1 * | 4/2021 | James | A01K 91/04 | |
| 2021/0337778 A1 * | 11/2021 | Boyette | A01K 97/04 | |

FOREIGN PATENT DOCUMENTS

| | | | | |
|---|---|---|---|---|
| GB | 2531262 A | * | 4/2016 | A01K 97/02 |
| JP | 2007209228 A | * | 8/2007 | |
| JP | 2014117215 A | * | 6/2014 | |
| JP | 2014117256 A | * | 6/2014 | |
| JP | 2021153526 A | * | 10/2021 | |
| KR | 20070000386 U | * | 4/2007 | |
| KR | 200464039 Y1 | * | 12/2012 | |
| KR | 20130001092 A | * | 1/2013 | |
| WO | WO-8902988 A1 | * | 4/1989 | |
| WO | WO-2007137358 A1 | * | 12/2007 | A01K 91/06 |

* cited by examiner

MULTI-FACET LURE

CROSS REFERENCE TO RELATED APPLICATION

This application claims priority from U.S. Provisional Patent Application No. 62,423,480 filed on Nov. 17, 2016 and entitled MULTI-FACET LURE, the teachings of which are incorporated herein in their entirely.

FIELD OF THE INVENTION

The present invention relates to an improved fishing lure. More particularly, the present invention relates to a fishing lure having multiple hooks with the capacity for varying the bait and size of lures. Having a built-in compartment adapted for the insertion of live bait, synthetic bait or chum used in the attraction of fish.

BACKGROUND OF THE INVENTION

Artificial fishing lures come in many sizes and shapes. The goal of a fishing lure is to attract a particular type of species. Fishing lures can be made of metals, wood, hard and soft plastics, or even carbon resin materials, having a hock at the end. The lure may use movement, vibration, flash, or color to bait a fish.

There are many techniques for fishing among them are: Still fishing, drift fishing, live fishing, bottom bouncing, trolling, or jigging. Still fishing is a technique whereby the fisherman fishes from a pier, a bridge, anchored boat or from the shore. A float or bobber is attached to a fishing line that is allowed to reach the bottom in ponds, lakes, rivers or streams. Additional lines are attached at different levels close to the bottom to draw fish in.

Drift fishing is a technique that allows a fisherman to fish over a variety of habitats whereby the lures stay just above the bottom and appear to move with the boat as it drifts. In this scenario, live bait works best.

Another technique is called Live lining; this is where a line is live when the boat is anchored in a flowing body of water like a river or stream. Live bait or lures are kept just above the bottom giving the impression the lure is alive.

Another technique used is called Bottom Bouncing, this is done from a drifting boat or trolling boat, where bait is placed at the end of the line rubbing about the bottom of the pond, river, stream. Live bait is dragged along the bottom creating motion and drawing attention to itself.

Yet another technique used is called trolling. Most trolling is done using a small electric motor that moves a boat quietly through the water. This quietness gives the impression of a moving fish. It can be done form a bridge, pier, or shoreline. The bottom line is used to determine what fish is caught.

Despite the above-mentioned fishing techniques, typically a single bait is used for a particular fish species. In order to attract a different species a different lure or bait must be used.

There is a need in the field for a multi fish catching lure that offers a plurality of baits and means of attracting fish.

The present invention relates to a multi-functional improved lure for use when fishing.

SUMMARY OF THE INVENTION

The current invention relates to a novel and improved fishing lure. Its effectiveness is related to its unique ability to combine various baits in a single lure device, it also has the unique ability of storing either live bait, synthetic bait, bait, or chum at its center. The invention is customizable and scalable to adopt to different fishing techniques. These unique properties can attract many different types of fish. The embodiment also permits various types of hooks to be applied to its external surface.

DESCRIPTION OF THE DRAWINGS

The preferred embodiments of the invention will hereinafter be described in conjunction with the appended drawings provided to illustrate and not to limit the invention, in which.

Figure 1:
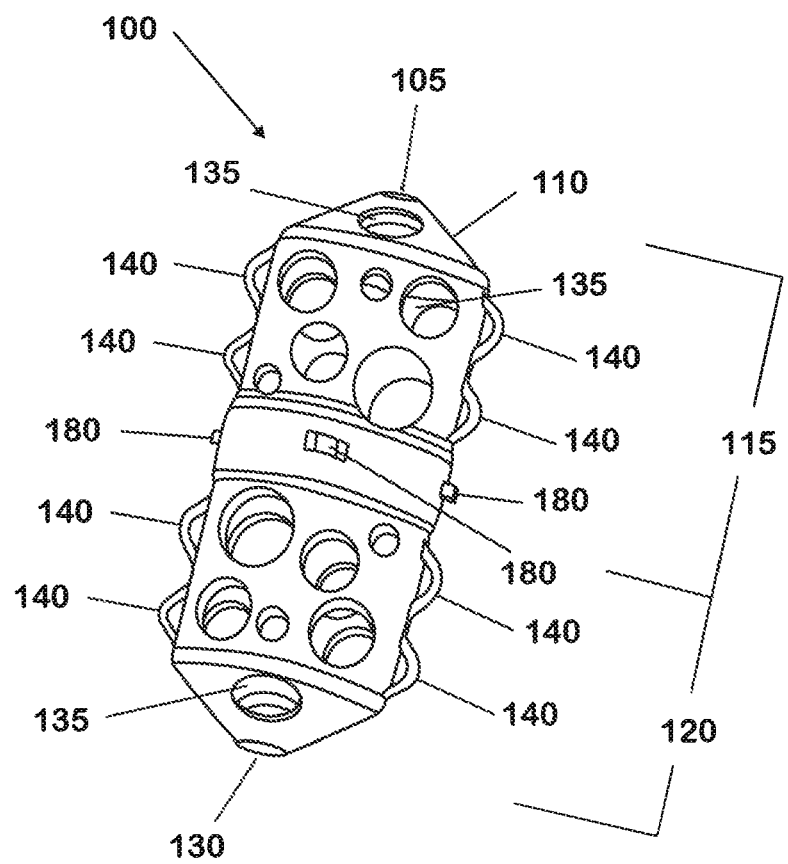
FIG. 1 provides a side perspective view of the Multi-Facet Lure device.

Like reference numerals refer to like parts throughout the several views of the drawings. While the various features of this invention are hereinafter described and illustrated as being adapted for providing a specialized fishing lure the invention is not limited to the embodiments illustrated in the drawings but are merely used to illustrate the wide variety of uses of this invention. Therefore, the foregoing is considered as illustrative only of the principles of the invention. Since numerous modification and changes will readily occur by those skilled in the art, it is not desired to limit the invention to the exact construction and operation shown and described and accordingly, all suitable modifications and equivalents may be resorted to, falling with the scope of the invention.

DETAILED DESCRIPTION OF THE PREFERRED EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the drawings of FIG. 1 Multi-facet Lure Device (100), is illustrated not having any cords or fishing line attached, this is the starting position of a fisherman. It consists of a Top Hook Opening (105) and a Bottom Hook Opening (130) whereby different types of Fishing Line and attaching hooks may be used. The Multi-Facet Lure (100) consists of two main halves the upper half (115), and the Lower Half (120). These halves are screwed together through inner threads (185) of FIG. 3 to form a single unit. Openings (135) are distributed throughout permitting the bait or chum not shown to dissipate its sense to the surrounding water. Anchoring rings (140) are placed uniformly around the Multi-Facet Lure (100) for the purpose of attaching camouflage materials 198 (see FIG. 6), hooks or fishing lines. The hooks can be of different sizes having different bait attached to it. The Multi-Facet Lure (100) is configured in such a way that it maintains is neutral buoyance. Device Fin (180) is designed in such a manner that it causes the Multi-Facet Lure to rotate clockwise giving it a spinning action. This spinning action is used to attract other fishes to it and spreads the smell of bait or chum that is located in the Cavity Holder inner chamber outwards. Many variating sizes of opening (135) can be used with staggering patterns. By having several variations of bait and chum in the inner chamber many different types of fishes are caught.

Figure 2:
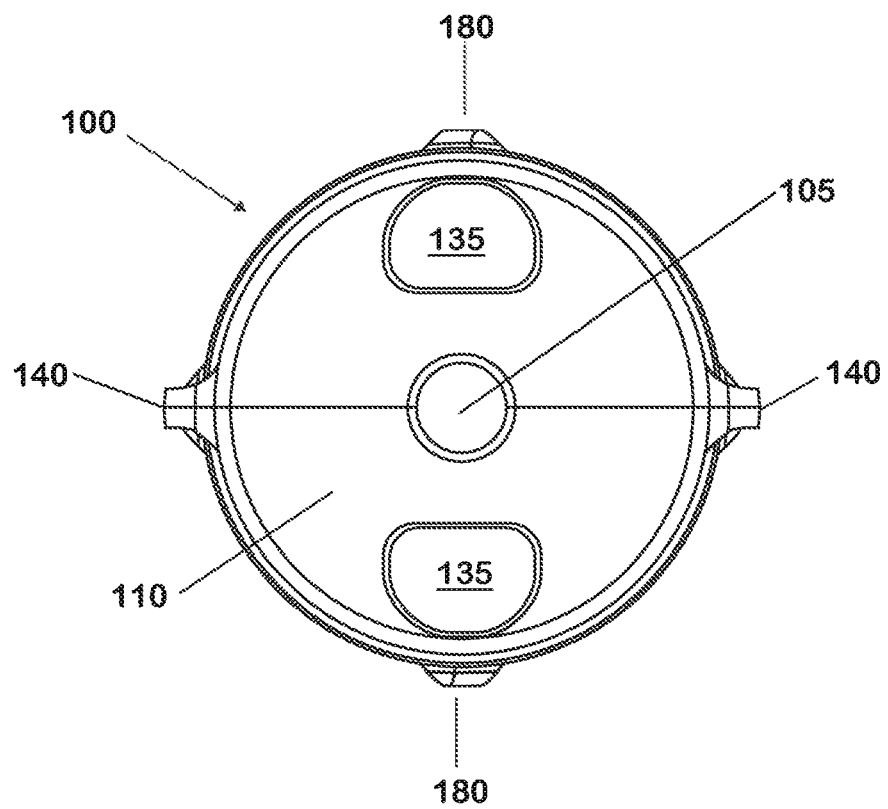
FIG. 2 provides top perspective view of the Multi-Facet Lure device and its openings.
Figure 6:
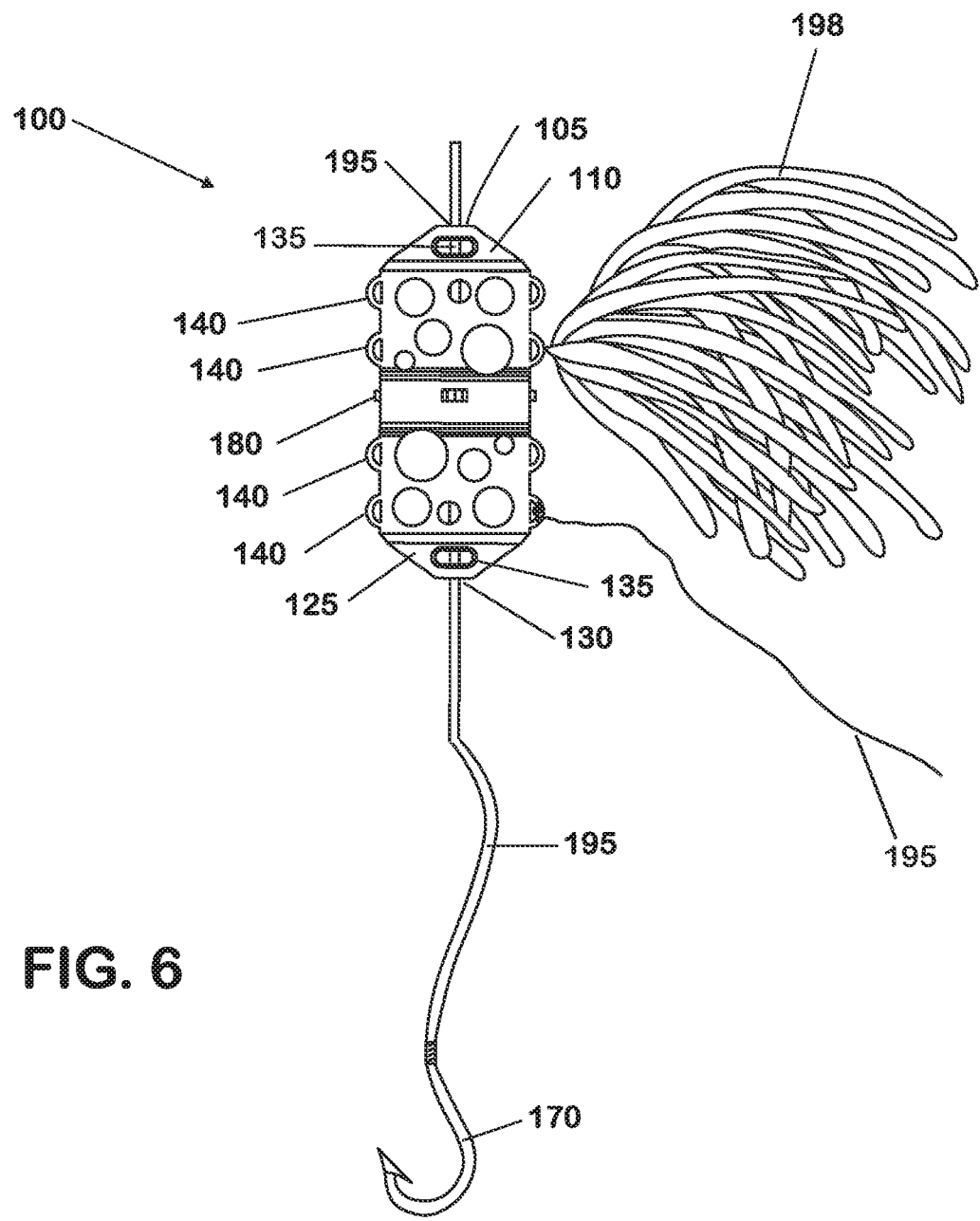

With respect to FIG. 2 a top perspective view of the preferred embodiment is shown having uniform Anchoring Rings (140) at its side and a Top Opening (105) used for inserting an optional Hook or Fishing Line or camouflage materials 8 (see FIG. 6. Uniformity is maintained throughout its construction for proper balancing. Top cone (110) and bottom cone (125) are designed in a funnel shape configuration which allows an aerodynamic passage of water when it travels through the water.

Figure 3:
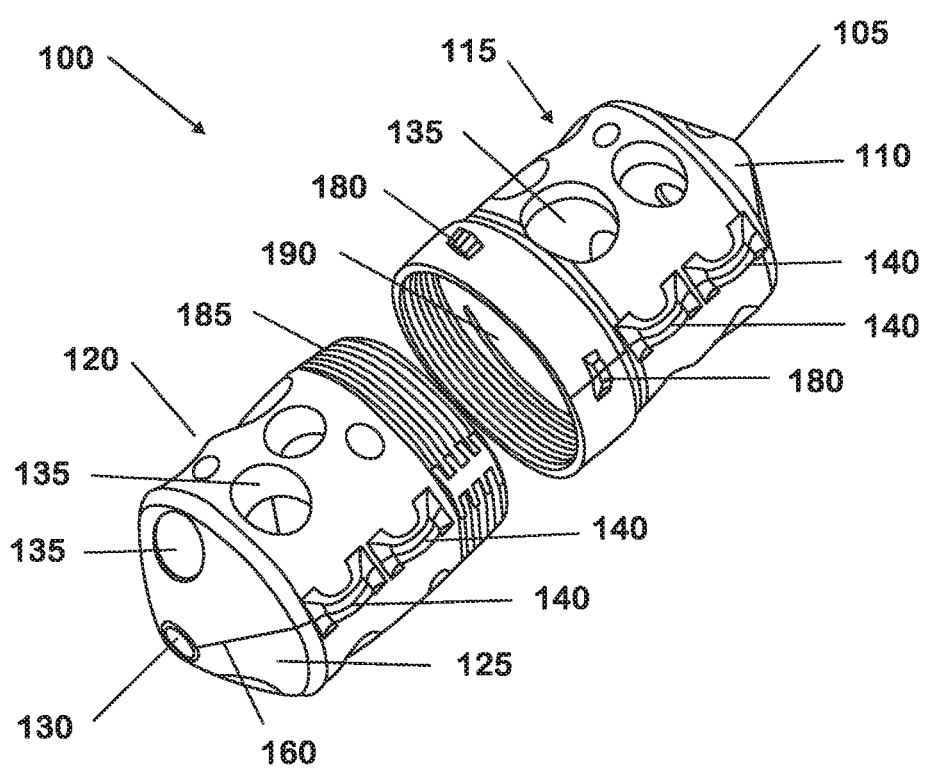
FIG. 3 provides a side perspective view showing the two halves of the Multi-Facet Lure prior to engagement.

With respect to FIG. 3 a side perspective view of the Multi-Facet Lure is illustrated showing the two halves of the Multi-Facet Lure (100) prior to engagement. Shown is the Center Line (160) and Top Opening (105) and Bottom Opening (130). It clearly shows that many configurations are possible through the Anchoring Rings (140) and Openings (135). The anchoring rings (140) can also act as fins used to guide the Multi-Functional Device. The Fishing Bait or Chum (Not Shown) is inserted into Cavity Area (190) where it remains encapsulated and gives off smell and attracts corresponding fish.

Figure 4:
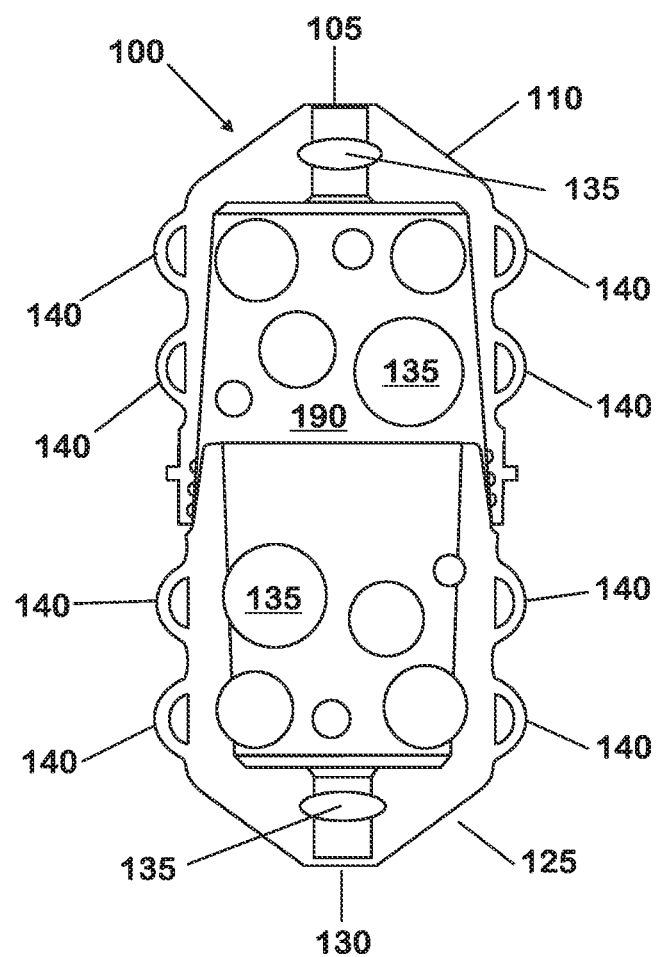
FIG. 4 provides a sectional view of the Multi-Facet Lure with the inner chamber exposed showing where the live bait or chum may be stored.

With respect to FIG. 4. across sectional view of the Multi-Facet Lure device (100) is illustrated showing the Cavity Area (190) clearly located in the center of the device allowing live bait or chum to be stored. Note that the Cavity Area (190) permits a large area for storage through the Upper Half (115) and Lower Half (120). Bottom Hook Opening (130) has the option of employing a hook of multiple lengths. A fishing line can easily pass from Top Hook Opening (105) through Cavity Area (190) outward through Bottom Hook Opening (130). The inner chamber of the Cavity Area can be altered to allow more or less area for the bait.

Figure 5:
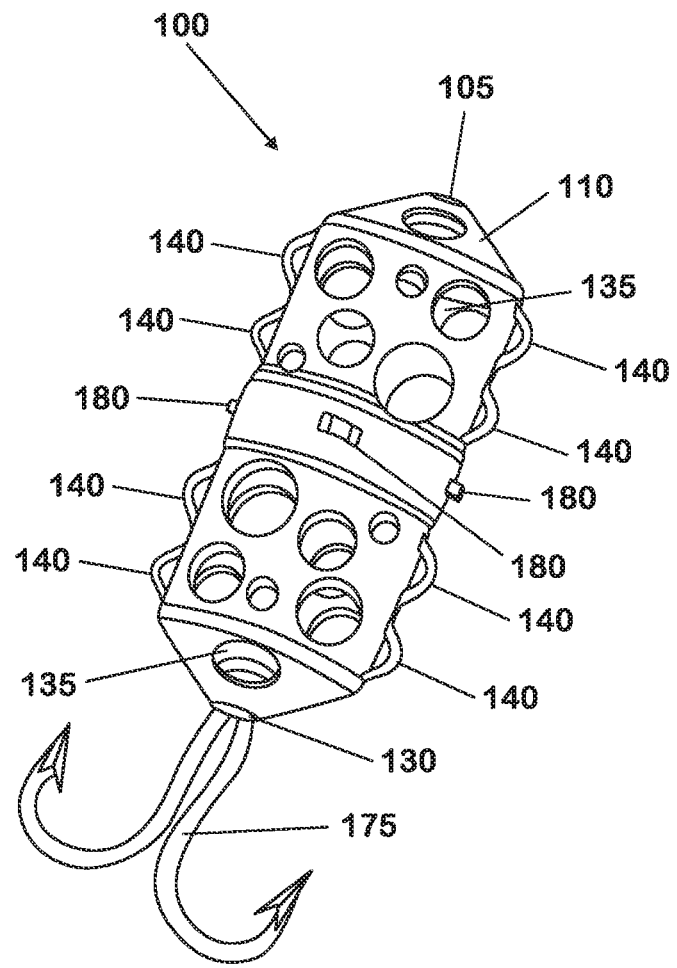
FIG. 5 provides a perspective view of the Multi-Facet Lure Device having multiple hooks, and FIG. 6 provides a perspective view of the Multi-Facet Lure Device incorporating a single extended hook.

With respect to FIG. 5 a perspective view of the Multi-Facet Lure Device (100) having multiple hooks, coming out through Bottom Opening (130), note that the hook is not limited to two but may have many more of different designs. The Double Hook (175) can be used to catch fish that are nibbling at the chum located in the Cavity area (190). The Device Fins (180) are designed such that they cause the device to spin clockwise as the device is pulled through the water. Anchoring Rings (140) may also include hooks of different configurations.

With respect to FIG. 6 an elongated Single Hook (170) embodiment is illustrated. In this configuration, Live bait may be attached to the hook of a certain kind, and a different bait inside the Cavity Area (190). The hook may be used to drag along the bottom creating noise while the Multi-Function Lure moves along the water. The length of the Fishing Line (195) can be adjustable in its length.

It should be noted that custom openings (135) give the device the ability to spread the scent of the bait near the Multi-Functional Device (100). The custom openings (135), Anchoring Fins, and Anchoring Rings (140) may vary in size and location. The Cavity Area (190) is such designed that live bait may be placed inside it. The device is configured so that it is scalable and customizable to different fishing techniques. Camouflage material 198 can be engaged with an anchoring ring 140.

As will be recognized by those of ordinary skill in the pertinent art, numerous modifications and substitutions can be made to the above-described embodiments of the present invention without departing from the scope of the invention. Accordingly, the preceding portion of this specification is to be taken in an illustrative, as opposed to a limiting sense.

What is claimed:

1. A neutrally buoyant fishing lure comprising:
 a two-piece hollow body that accepts therein any form of bait, the bait being accessible through openings in the body, the two pieces forming the body being engageable with each other, wherein the two pieces forming the body are mirror images of each other when the two pieces forming the body are engaged to one another;
 the two pieces of the two-piece hollow body comprising an upper half and a lower half;
 the upper half comprising a distal end and a proximal end, wherein the distal end of the upper half is conical in shape;
 the lower half comprising a distal end and a proximal end, wherein the proximal end of the lower half is conical in shape;
 the upper half being releasably engageable to the lower half;
 the upper half having the same dimensions as the lower half, wherein the neutrally buoyant fishing lure is uniformly constructed when the upper half is engaged to the lower half;
 the upper half comprising the same number of openings in the body as the lower half, wherein the openings in the body are staggered in pattern;
 a central cavity defined within the two-piece hollow body;
 a bottom opening of the openings in the body centrally located at the proximal end of the lower half and a top opening of the openings in the body centrally located at a distal end of the upper half for receipt of one or more fishing lines therein, wherein the top opening allows the one or more fishing lines to be threaded into the neutrally buoyant fishing lure, through the central cavity, and exit the neutrally buoyant fishing lure through the bottom opening;
 at least four anchoring rings mounted on the upper half and at least four anchoring rings mounted on the lower half;
 the at least four anchoring rings mounted on the upper half being semi-elliptical or semi-circular in shape and oriented longitudinally along the upper half and the at least four anchoring rings mounted on the lower half being a mirror image of the at least four anchoring rings mounted on the upper half, wherein one end of one of the at least four anchoring rings is aligned with one end of a next one of the other at least four anchoring rings; and at least four fins, each fin comprising a front end and a back end, positioned centrally on the two-piece body of the neutrally buoyant fishing lure, wherein the back end of one fin of the at least four fins is positioned at a different radial position on a circumference of the two-piece hollow body with respect to the front end of another fin of the at least four fins and the at least four fins cause the neutrally buoyant fishing lure to spin counterclockwise as the neutrally buoyant fishing lure is pulled through the water.

2. The neutrally buoyant fishing lure of claim 1 wherein the two pieces of the hollow body are releasably screw-threaded to each other.

3. The neutrally buoyant fishing lure of claim 1 wherein the openings in the body are provided all along the body, both lengthwise and circumferentially.

4. The neutrally buoyant fishing lure of claim 1 wherein the two-piece body is substantially cylindrical in shape.

5. The neutrally buoyant fishing lure of claim 4 wherein more than one of the anchoring rings is engageable to at least one fishing line of the one or more fishing lines threaded through the top opening in the lure.

6. The neutrally buoyant fishing lure of claim 1 wherein at least one of the anchoring rings is engageable to at least one fishing line of the one or more fishing lines threaded through the bottom opening in the lure.

7. The neutrally buoyant fishing lure of claim 6 wherein more than one of the anchoring rings is engageable to at least two fishing lines of the one or more fishing lines threaded through the bottom opening in the lure.

8. The neutrally buoyant fishing lure of claim 1 wherein fishing line is attached to one or more of the anchoring rings.

9. The neutrally buoyant fishing lure of claim 1 being made of any suitable material.

10. The neutrally buoyant fishing lure of claim 1 wherein camouflage materials are attached to at least one of the anchoring rings.

11. The neutrally buoyant fishing lure of claim 1 wherein at least one hook is attached to the one or more fishing lines extending from the top opening or the bottom opening.

* * * * *